United States Patent

[11] 3,588,194

| | | |
|---|---|---|
| [72] | Inventors | Walter Muller<br>Zurich;<br>Pius Fischer, Rumlang, Switzerland |
| [21] | Appl. No. | 860,233 |
| [22] | Filed | Sept. 23, 1969 |
| [45] | Patented | June 28, 1971 |
| [73] | Assignee | Werkzeugmaschinenfabrik Oerlikon-<br>Buhrle A.G.<br>Zurich, Switzerland |
| [32] | Priority | Oct. 1, 1968 |
| [33] | | Switzerland |
| [31] | | 14692/68 |

[54] INDIRECTLY ACTING COMPRESSED AIR BRAKE DEPENDENT ON THE LOAD
4 Claims, 2 Drawing Figs.

| [52] | U.S. Cl. | 303/23 |
|---|---|---|
| [51] | Int. Cl. | B60t 8/18 |
| [50] | Field of Search | 303/22, 22 (A), 23; 188/195 |

[56] References Cited
UNITED STATES PATENTS

| 2,332,620 | 10/1943 | White | 303/23 |
|---|---|---|---|
| 3,425,752 | 2/1969 | Pollinger et al. | 303/23 |

*Primary Examiner*—Milton Buchler
*Assistant Examiner*—John J. McLaughlin
*Attorney*—Wenderoth, Lind and Ponack ABSTRACT: An indirectly acting compressed air brake dependent on the load having an empty brake cylinder for the braking of an empty vehicle and a load brake cylinder which acts on the same brake-rod linkage connected to a pressure transmitter which is controlled in dependence upon the service load and the pressure in the empty brake cylinder. A filling device controlled by a brake pressure limiting valve is provided for the load brake cylinder. The filling device produces, upon the starting of the brake in the load brake cylinder even in the case of an empty or only partly loaded vehicle, an initial or admission pressure, dependent upon the brake pressure limiting valve to overcome restoring spring forces. The filling device has a piston capable of being acted on by compressed air from the brake pressure limiting valve operatively connected to an inlet valve of the pressure transmitter. It also has a double nonreturn check valve, by which the load brake cylinder can be acted upon by compressed air both from the brake pressure limiting valve and from the pressure transmitter.

PATENTED JUN 28 1971   3,588,194

WALTER MÜLLER
PIUS FISCHER
INVENTORS

By Wenderoth, Lind & Ponack
ATTORNEYS

INDIRECTLY ACTING COMPRESSED AIR BRAKE DEPENDENT ON THE LOAD

This invention relates to an indirectly acting compressed air brake dependent on load, more especially for railways and of the type having an empty brake cylinder for the braking of the empty vehicle, as well as with a load brake cylinder which acts on the same brake-rod linkage and which is connected to a pressure transmitter which is controlled in dependence upon the service load and the pressure in the empty brake cylinder.

In a known compressed air brake of this type for railway goods wagons of the smallest possible tare and largest possible service load, the brake force internationally prescribed for the relevant category of wagon for all loading conditions can be readily obtained on full braking. However, upon the first application of the brake—if the brake cylinder pressure amounts to approximately 0.8 kg./cm.$^2$—the resulting brake block pressure with this two-cylinder brake arrangement is substantially lower with an empty vehicle than with a fully loaded vehicle. These lower brake block pressures are caused by varying influence of the forces of the restoring springs of the regulator of the linkage and brake-rod linkage with an empty and fully loaded vehicle. Upon the first application of the brake, the block pressure should amount to 6—15 percent of the block pressure on a full braking, regardless of whether the vehicle is empty or loaded.

The aim of the present invention is to provide a brake device of the type concerned which meets this requirement.

This requirement is met, in the brake according to the invention, by a filling device, which can be controlled by a brake pressure limiting valve, for the load brake cylinder, which filling device produces, upon the first application of the brake in the loading brake cylinder even in the case of an empty or partly loaded vehicle, and additional pressure, which is dependent on the brake pressure limiting valve, to overcome the restoring spring forces.

In order that the invention may be more clearly understood two embodiments of the compressed air brake of the invention will now be more fully described by way of example with reference to the accompanying drawings, in which.

Figure 1:
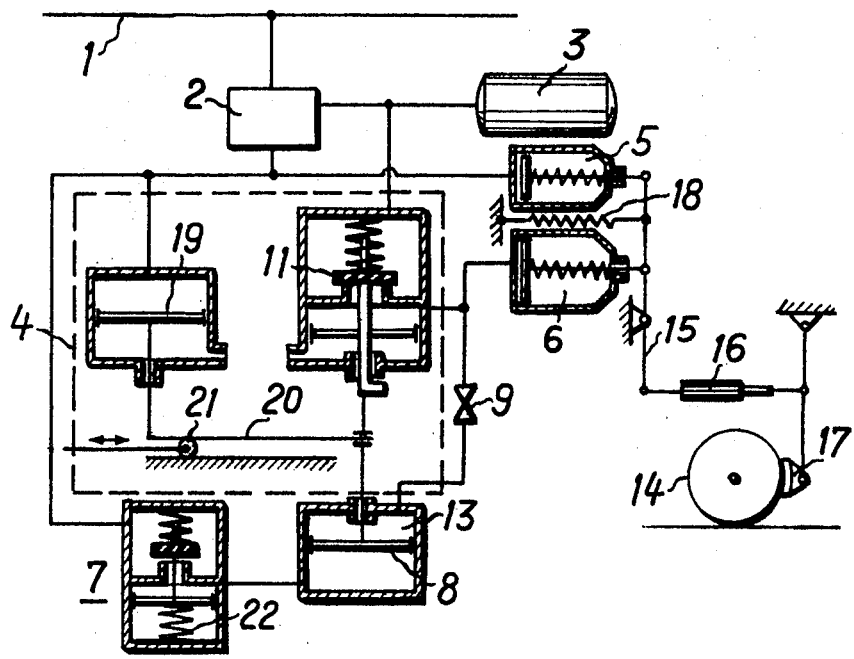
FIG. 1 shows a diagrammatic representation of a compressed air brake according to a first embodiment.

According to FIG. 1, an indirectly acting control valve 2 is connected to a main air line 1 running through the whole train. The control valve 2 is connected, on the one hand, to an auxiliary air tank 3 and an empty braking cylinder 5. Connected furthermore to the control valve 2 is a pressure transmitter 4, which has the parts contained in the rectangle 4 shown in broken lines. This pressure transmitter 4 is also connected to the auxiliary air tank 3 and to a load brake cylinder 6. The empty brake cylinder 5 and the load brake cylinder 6 are connected to the brake-rod linkage 15, on which a brake block 17 is hinged via a linkage regulator 16. Fastened furthermore to the brake-rod linkage 15 is a restoring spring 18, which endeavors to lift the brake block 17 from the wheel 14 of the vehicle when the brake is released.

A piston 19 of the pressure transmitter 4 is acted upon by the compressed air from the control valve 2 and serves for the actuation of an inlet valve 11 via a two-armed lever 20. This lever 20 is mounted on a movable roller 21. The roller 21 moves further to the left or to the right depending on the loading of the vehicle, so that the length of the two arms of the two-armed lever varies and the inlet valve 11 is opened, on the one hand, in dependence upon the pressure in the control valve 2 and, on the other hand, in dependence upon the load of the vehicle. The inlet valve 11 makes possible the entry of compressed air from the auxiliary air tank 3 into the load brake cylinder 6.

The parts hitherto described are known per se and their mode of operation is as follows:

When the air pressure in the main air line 1 drops the control valve 2 responds and produces, for example, an additional loading pressure of 0.8 kg./cm.$^2$. In the case of an empty vehicle, the roller 21 of the pressure transmitter is situated completely to the left as shown in FIG. 1. The pressure acting on the piston 19 is not in a position to open the inlet valve 11. The initial or admission pressure therefore acts exclusively on the empty brake cylinder 5. With a piston area of the empty brake cylinder of 180 cm.$^2$ and with a force of 200 kg. of the restoring spring 18, a resulting brake piston force of 180×0.8 −200=−56 kg is produced, i.e. no block pressure at all is produced with an empty wagon. However, if the wagon is fully loaded and the inlet valve 11 is opened upon the loading pressure, the load brake cylinder is then also acted upon. With a piston area of the empty brake cylinder and of the load brake cylinder totaling 900 cm.$^2$, and with the same force of the restoring spring of 200 kg., a brake force of 900×0.8−200=7 20 kg. is produced, i.e. 21 percent of the maximum block pressure on full braking with the internationally prescribed maximum brake cylinder pressure of 3.8 kg./cm.$^2$.

If the initial or admission pressure is raised from 0.8 kg./cm.$^2$ to 1.2 kg./cm.$^2$, there is, in fact, a positive resulting brake piston force of 180×1.2−200=16 kg. with an empty vehicle, and with a fully loaded wagon the brake piston force increased through the additional influencing of the load brake cylinder to 900×1.2−200=1,080 kg., i.e. 32 percent of the maximum block pressure on full braking.

If there are partly empty and partly fully loaded vehicles in long trains, the varying brake piston forces cause undesirable buffer reactions.

The additional elements described hereinafter have the object of maintaining the resulting initial or admission pressure both with an empty and with a fully loaded vehicle within the prescribed limits of approximately 6—15 percent of the full braking value.

With this object, according to a first exemplified embodiment, in addition a brake pressure relief limiting valve 7 is connected to the control valve. This brake pressure limiting valve 7 has a valve spring 22 which keeps the valve 7 open, as long as the pressure of the compressed air coming from the control valve 2 does not exceed a certain value. An auxiliary piston 8, which on the one hand is acted upon by the pressure of the compressed air from the brake pressure limiting valve 7, serves for the actuation of the inlet valve 11. The auxiliary piston 8 is, on the other hand, acted upon by the pressure of the compressed air in the load brake cylinder via a restrictor. The method of operation of these additional members according to the first exemplified embodiment is as follows:

If an initial or admission pressure is produced by lowering of the air pressure in the main air line 1 and by the response of the control valve 2, the brake pressure limiting valve 7 then remains open and the auxiliary piston 8 is likewise acted upon by the additional pressure, whereby the inlet valve 11 is opened and the piston of the load brake cylinder 6 is acted upon by the compressed air from the auxiliary air tank 3. Consequently, upon the first application of the brake, not only the empty brake cylinder 5 but also the load brake cylinder 6 is acted upon by compressed air from the control valve 2 or from the auxiliary air tank 3.

The brake pressure limiting valve 7 is closed at certain value for example, 0.2—0.4 kg./cm.$^2$, whereby the inlet valve 11 is also closed, in so far as it is not kept open by the effect of the service load. The closing of the inlet valve can be influenced temporarily per unit of time by means of the choke bore 9 by the rising brake cylinder pressure on the other side of the auxiliary piston 8, so as to obtain a rapid forward stroke of the piston in the load brake cylinder until the brake blocks are applied.

Figure 2:
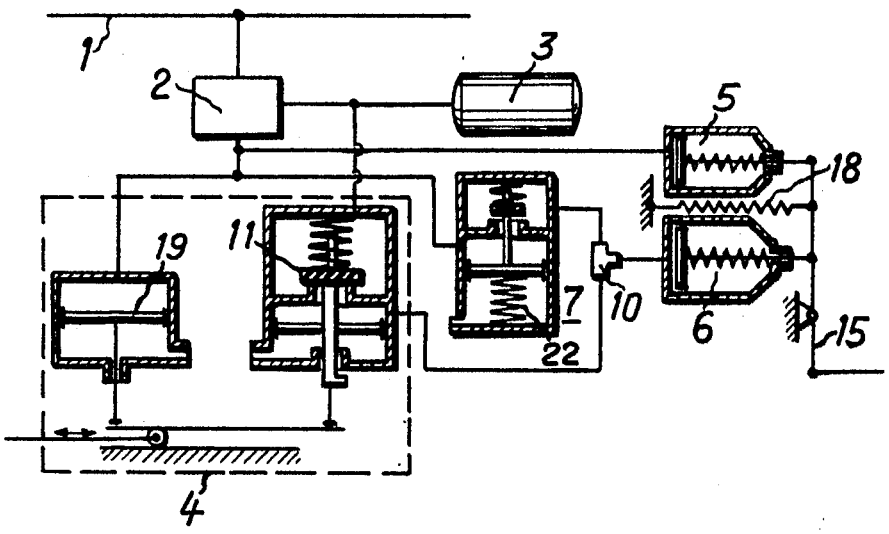
FIG. 2 shows a diagrammatic representation of a compressed air brake according to a second embodiment.

The second embodiment according to FIG. 2 differs from the first embodiment according to FIG. 1 substantially in that, instead of the auxiliary piston 8, a double nonreturn check valve is provided through which both from the inlet valve 11 and from the brake pressure limiting valve 7 compressed air from the auxiliary compressed air tank 3 or from the control valve 2 can enter the loading brake cylinder. The brake pressure limiting valve 7 in the second embodiment is designed exactly as in the first embodiment.

The method of operation of this second embodiment is as follows:

If an initial or admission pressure is produced by lowering of the air pressure in the main air line 1 and by the response of the control valve 2, the brake pressure limiting valve 7 then remains open and both the empty brake cylinder 5 and the load brake cylinder 6 are acted upon by the compressed air flowing from the control valve 2, whereby the air from the brake pressure limiting valve 7 enters the load brake cylinder 6 via the double nonreturn check valve 10. As stated above, the brake pressure limiting valve 7 is closed upon a pressure of 0.2—0.4 kg./cm.$^2$, whereby the actuation of the loading brake cylinder is interrupted. Upon further rising pressure, i.e. on stronger braking, the further actuation of the load brake cylinder 6 is effected via the inlet valve 11 of the pressure transmitter 4 and the reversed double nonreturn valve 10 in dependence upon the load of the vehicle.

We claim:

1. An indirectly acting compressed air brake dependent on the load, more especially for railways, having restoring spring forces, comprising a brake-rod linkage, an empty brake cylinder acting on said brake-rod linkage for the braking of an empty vehicle, a load brake cylinder acting on said same brake-rod linkage, a pressure transmitter controlled in dependence upon the service load and the pressure in said empty brake cylinder, said load brake cylinder being connected to said transmitter, a brake pressure limiting valve for said load brake cylinder, a filling device controlled by said limiting valve so that upon the starting of the brake in the load brake cylinder even in the case of an empty or only partly loaded vehicle, an initial or admission pressure is produced dependent upon said brake pressure limiting valve to overcome said restoring spring forces.

2. A compressed air brake as claimed in claim 1, wherein said pressure transmitter has an inlet valve and said filling device has a piston capable of being acted on by compressed air from said brake pressure limiting valve, said piston being operatively connected to said inlet valve.

3. A compressed air brake as claimed in claim 1, wherein said filling device has a double nonreturn check valve whereby said load brake cylinder can be acted upon by compressed air both from said brake pressure limiting valve and from said pressure transmitter.

4. A compressed air brake as claimed in claim 2, wherein said piston is acted upon by compressed air from said brake pressure limiting valve and is capable of being acted upon by compressed air from said load brake cylinder via a choke bore.